United States Patent
Zhao et al.

(10) Patent No.: US 8,102,765 B2
(45) Date of Patent: Jan. 24, 2012

(54) CORRELATION-BASED RATE ADAPTATION FOR COMMUNICATION NETWORKS

(75) Inventors: Jun Zhao, Beijing (CN); Xia Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 11/767,424

(22) Filed: Jun. 22, 2007

(65) Prior Publication Data

US 2008/0316926 A1 Dec. 25, 2008

(51) Int. Cl.
*H04J 1/16* (2006.01)

(52) U.S. Cl. ...................... 370/230.1; 370/232

(58) Field of Classification Search .................. 370/229, 370/230, 232, 233, 234, 203, 463, 498, 537, 370/538, 230.1, 235, 464, 545; 375/130, 375/140, 141, 142, 147, 150
See application file for complete search history.

(56) References Cited

U.S. PATENT DOCUMENTS

| | | | |
|---|---|---|---|
| 6,252,854 B1 | 6/2001 | Hortensius et al. | |
| 6,751,199 B1 | 6/2004 | Sindhushayana et al. | |
| 6,922,445 B1 | 7/2005 | Sampath et al. | |
| 7,116,981 B2 | 10/2006 | Jeon et al. | |
| 7,191,381 B2 | 3/2007 | Gesbert et al. | |
| 2002/0114398 A1* | 8/2002 | Lin et al. ....................... | 375/253 |
| 2002/0126694 A1 | 9/2002 | Kahola | |
| 2002/0193133 A1* | 12/2002 | Shibutani ....................... | 455/522 |
| 2003/0003863 A1* | 1/2003 | Thielecke et al. .............. | 455/39 |
| 2003/0086371 A1* | 5/2003 | Walton et al. ................. | 370/235 |
| 2004/0082356 A1 | 4/2004 | Walton et al. | |
| 2004/0248520 A1* | 12/2004 | Miyoshi ....................... | 455/67.13 |
| 2005/0053038 A1* | 3/2005 | Kimura ........................ | 370/333 |
| 2005/0054296 A1* | 3/2005 | Chuang et al. ................ | 455/63.1 |
| 2005/0136844 A1 | 6/2005 | Giesberts et al. | |
| 2005/0272458 A1* | 12/2005 | Sakoda ........................ | 455/522 |
| 2006/0013287 A1* | 1/2006 | Normark et al. ............... | 375/142 |
| 2006/0045117 A1* | 3/2006 | Qi et al. ....................... | 370/445 |
| 2006/0093058 A1 | 5/2006 | Skraparlis | |
| 2006/0109931 A1 | 5/2006 | Asai et al. | |
| 2006/0203785 A1* | 9/2006 | Kim ............................. | 370/338 |
| 2007/0002742 A1* | 1/2007 | Krishnaswamy et al. .... | 370/235 |
| 2007/0066329 A1* | 3/2007 | Laroia et al. .................. | 455/502 |

OTHER PUBLICATIONS

Gupta, et al., "A Framework for Adaptive Voice Communication over Wireless Channels", available at least as early as Apr. 2, 2007, at <<http://shamir.eas.asu.edu/~mcn/publication/suhaib-framework.pdf>>, IEEE 2003, pp. 1096-1101.

(Continued)

*Primary Examiner* — Kwang B Yao
*Assistant Examiner* — Obaidul Huq
(74) *Attorney, Agent, or Firm* — Lees & Hayes, PLLC

(57) ABSTRACT

A correlation-based rate adaptation scheme (CORA) is enabled for practical communication devices that provides for communication data rate adaptation in a complex and/or rapidly changing communication environment. Correlations may be determined between adjustable parameters of a communication scheme and one or more performance metrics and/or communication scheme operating regimes. In the context of the correlation-based rate adaptation scheme, adjustable parameters of the communication scheme may be considered as defining a multi-dimensional parameter space, and the determined correlations may be considered as correlation maps that may be used to guide parameter selection and adjustment. The use of correlation maps enables extraction of information from imperfect and/or incomplete measurements, and the information collected in the correlation maps may be used to tune corresponding communication scheme parameters to enhance communication performance.

20 Claims, 11 Drawing Sheets

OTHER PUBLICATIONS

Holland, et al., "A Rate-Adaptive MAC Protocol for Multi-Hop Wireless Networks", available at least as early as Apr. 2, 2007, at <<http://delivery.acm.org/10.1145/390000/381700/p236-holland.pdf?key1=381700&key2=6807155711&coll=GUIDE&dl=Guide&CFID=18886828&CFTOKEN=21041023>>, ACM, 2001, pp. 236-250.

Ji, et al., "Exploiting Medium Access Diversity in Rate Adaptive Wireless LANs ", available at least as early as Apr. 2, 2007, at <<http://delivery.acm.org/10.1145/1030000/1023754/p345-ji.pdf?key1=1023754&key2=3116155711&coll=GUIDE&dl=GUIDE&CFID=15447550&CFTOKEN=20339438>>, ACM, 2004, pp. 345-359.

Lacage, et al., "IEEE 802.11 Rate Adaptation: A Practical Approach", available at least as early as Apr. 2, 2007, at <<http://delivery.acm.org/10.1145/1030000/1023687/p126-lacage.pdf?key1=1023687&key2=6646155711&coll=GUIDE&dl=GUIDE&CFID=18886113&CFTOKEN=12829605>>, ACM, 2004, pp. 126-134.

Aguayo, et al., "Link-Level Measurements from an 802.11b Mesh Network", ACM, 2004, pp. 11.

Bicket, "Bit-rate Selection in Wireless Networks", Massachusetts Institute of Technology, Feb. 2005, pp. 50.

Gast, Matthew "802.11 Wireless Networks: The Definitive Guide", Second Edition, Apr. 2005, O'Reilly Press, Chapter 15, 25 pages.

Gesbert, et al., "From Theory to Practice: An Overview of MIMO Space-Time Coded Wireless Systems", IEEE, vol. 21, No. 3, Apr. 2003, pp. 281-302.

Hu, et al., "A Reactive Channel Model for Expediting Wireless Network Simulation", ACM, 2005, pp. 2.

"IEEE P802.11 Wireless LANs Joint Proposal: High throughput extension to the 802.11 Standard: PHY", TGn Joint Proposal Technical Specification, Jan. 2006, pp. 83.

"IEEE P802.11 Wireless LANs Joint Proposal: High throughput extension to the 802.11 Standddard: MAC", TGn Joint Proposal Technical Specification, 2006, pp. 104.

Kamerman, et al., "WaveLAN-II: A High-Performance Wireless LAN for the Unlicensed Band", Bell Labs Technical Journal, 1997, pp. 118-133.

Kim, et al., "CARA: Collision-Aware Rate Adaptation for IEEE 802.11 WLANs", IEEE INFOCOM, 2006, pp. 11.

Kotz, et al., "The Mistaken Axioms of Wireless-Network Research", Jul. 18, 2003, pp. 14.

Kulkarni, et al., "MIMAC: A Rate Adaptive MAC Protocol for MIMO-based Wireless Networks", Dec. 20, 2004, pp. 14.

Pavon, et al., "Link Adaptation Strategy for IEEE 802.11 WLAN via Received Signal Strength Measurement", IEEE, International Conference on Communications, vol. 2, May 2003, pp. 6.

Punnoose, et al., "Efficient Simulation of Ricean Fading within a Packet Simulator", IEEE, 2000, pp. 4.

Reis, et al., "Measurement-Based Models of Delivery and Interference in Static Wireless Networks", ACM, 2006, pp. 12.

Sadeghi, et al., "Opportunistic Media Access for Multirate Ad Hoc Networks", ACM, 2002, pp. 12.

Sheth, et al., "MOJO: A Distributed Physical Layer Anomaly Detection System for 802.11 WLANs", ACM, 2006, pp. 191-204.

Wong, et al., "Robust Rate Adaptation for 802.11 Wireless Networks", Mobicom '06, Sep. 23-26, 2006, Los Angeles, CA, See Section 4 (on state-of-the-art rate adaptation algorithms) and Section 5 (Design).

* cited by examiner

CORRELATION-BASED RATE ADAPTATION FOR COMMUNICATION NETWORKS

BACKGROUND

It has become common for people to use computer networks to communicate in a variety of ways. From electronic mail, instant messaging and multimedia documents to interactive audio, video and virtual realities, each type of communication is somewhat dependent on underlying communication links that join individual computers into a network. Types of communication requiring high bandwidth, low latency communication links are typically more dependent on link quality than less demanding communication types.

There has further come to be a wide variety of types of communication link, wired and wireless, each with its benefits and drawbacks. Of course, communication scheme designers would like to maximize benefits and minimize drawbacks. However, this can be a challenge, particularly where a communication link operates in a context of a complex and/or rapidly changing communication environment. Such communication environments are characteristic for wireless communication links to mobile computing devices, and this type of communication link will serve as the main source of examples in this description.

Modern communication schemes, and particularly wireless communication schemes, typically incorporate multiple data encodings to cope with a multiplicity of communication environments. For example, one set of data encodings may provide high data rates when received signal strength and/or the signal to noise ratio is high, while another set may provide a reliable but lower data rate in a poorer communication environment. Although not limited to optimization of data rate, throughput is significant for a wide variety of communication types, and the problem of selecting good and/or best data encodings for a complex and changing communication environment is referred to herein as the rate adaptation problem.

Conventional approaches to the rate adaptation problem have significant failings. Some approaches have satisfactory theoretical performance but are unsatisfactory in practice. A common failing in these approaches is to assume a level of information about a communication link and/or channel that is difficult to obtain in practical (e.g., economically viable) devices and/or that requires additional protocol overhead. In particular, it is typically impractical for a transmitter to obtain high quality signal to noise ratio (SNR) and/or received signal strength indication (RSSI) information for its receivers, even with additional protocol overhead, due at least to rapid fluctuations in such SNR and/or RSSI values in practical communication environments. In some cases, the quality of available information is deliberately lowered (e.g., smoothed and/or oversmoothed) from the perspective of the rate adaptation problem. In some approaches, practical issues such as mobile nodes and the hidden node problem (i.e., nodes located so as to be unable to coordinate access to a common wireless hub or access point) significantly reduce rate adaptation effectiveness.

Some conventional approaches to the rate adaptation problem simply reduce or increase data rate based on observed packet loss. Again, while such a "black-box" approach may have satisfactory results in theory or, for example, in a simple communication environment, in complex practical communication environments blind rate adjustment can result in throughput fluctuations that degrade user experience. Some conventional black-box approaches collect long term statistics in an attempt to ameliorate such fluctuations, but these typically fail to prevent jarring short-term link quality fluctuations in rapidly changing (e.g., mobile) communication environments.

SUMMARY

A correlation-based rate adaptation scheme (CORA) is enabled for practical communication devices that provides for communication data rate adaptation in a complex and/or rapidly changing communication environment. Correlations may be determined between adjustable parameters of a communication scheme and one or more performance metrics and/or communication scheme operating regimes. In the context of the correlation-based rate adaptation scheme, adjustable parameters of the communication scheme may be considered as defining a multi-dimensional parameter space, and the determined correlations may be considered as correlation maps that may be used to guide parameter selection and adjustment. The use of correlation maps enables extraction of information from imperfect and/or incomplete measurements, and the information collected in the correlation maps may be used to tune corresponding communication scheme parameters to enhance communication performance.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

In an embodiment of the invention, a correlation-based rate adaptation scheme (CORA) is enabled that determines correlations (i.e., correlative relationships) between adjustable parameters of a communication scheme and one or more performance metrics and/or communication scheme operating regimes. The correlations may be used to adjust the parameters of the communication scheme to enhance communication performance, for example, to raise a probability of the communication scheme to attain and/or remain in a desirable operating regime. In an embodiment of the invention, the use of correlations enables extraction of information from imperfect and/or incomplete measurements. In particular, communication data rate adaptation in a complex and/or rapidly changing communication environment may be enabled for practical communication devices.

Figure 1:
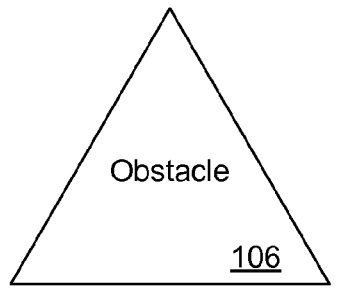
FIG. 1 is a schematic diagram depicting an example computing environment in accordance with an embodiment of the invention.
Figure 1:
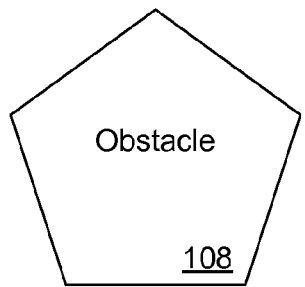
Figure 1:
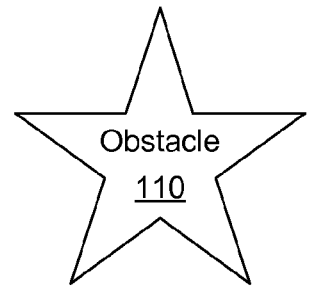

Before describing embodiments of the invention in detail, it will be helpful to describe an example computing environment suitable for incorporating embodiments of the invention. FIG. 1 depicts such an example computing environment 100. The computing environment 100 includes a wireless network access point (AP) 102. The wireless network access point 102 provides varying degrees of service to a variable service area that, at times, includes a mobile computing device 104. The service provided by the wireless network access point 102 may be affected by one or more service obstacles 106, 108, 110. For clarity, FIG. 1 depicts one wireless network access point 102, one mobile computing device 104 and three service obstacles 106, 108, 110, however suitable computing environments may include any suitable number of wireless network access points, mobile computing devices and/or service obstacles.

The wireless network access point 102 may provide suitably equipped computing devices such as the mobile computing device 104 with access to a data network (not shown in FIG. 1). The wireless network access point 102 may support a wireless communication link with the mobile computing device 104 and like devices with any suitable wireless communication protocol, for example, a communication protocol in accordance with one of the Institute of Electrical and Electronics Engineers (IEEE®) 802.11 series of standards. For example, the wireless network access point 102 may include any suitable computing device and network interface hardware such as one or more wired and/or wireless network interface cards (NIC).

The mobile computing device 104 may include any suitable computing device and may be in motion, for example, relative to the wireless network access point 102. Examples of suitable computing devices (i.e., computers) include portable computers, laptop computers, tablet computers, personal digital assistants (PDAs), mobile telephones, programmable consumer electronics devices, mainframes, minicomputers, desktop computers, personal computers (PCs), workstations, routers, gateways, switches, hubs, and suitable combinations thereof. Suitable computing devices may include one or more processing units capable of executing instructions to perform tasks, as well as one or more types of computer-readable media such as volatile and/or non-volatile memory capable of storing data, computer programs and/or computer program components. Such computer programs and components may include executable instructions, structured data and/or unstructured data organized into modules, routines and/or any suitable programmatic object. Such computer programs and components may be created by and/or incorporate any suitable computer programming language.

Suitable computing devices may include a wide variety of input/output (I/O) devices not shown in FIG. 1 such as keyboards, keypads, touchpads, mice, trackballs, pens, joysticks, gamepads, scanners, cameras, microphones, monitors, liquid crystal displays (LCDs), light emitting diodes (LEDs), printers and/or speakers. Examples of computer-readable media suitable for reading by computing devices in accordance with an embodiment of the invention include any one or more of magnetic media (such as hard disks), optical media such as compact disks (CDs) and communication media. Communication media may include any one or more of wired communication media such as copper wire, coaxial cable and optical fiber, as well as wireless communication media such as electromagnetic media including radio, microwave, infra-red and laser light. In an embodiment of the invention, computer-readable media is tangible.

For clarity, embodiments of the invention may be described herein with reference to symbolic operations such as those of a computer programming language. Such symbolic operations and any data that they act upon correspond to physical states of components and changes in components of suitable computing devices in a manner well understood by one of skill in the art. In an embodiment of the invention, each such operation and its associated data may be fully implemented in hardware.

The mobile computing device 104 may further include any suitable network interface hardware, for example, one or more wired and/or wireless network interface cards compatible with the network interface hardware of the wireless network access point 102. As the mobile computing device 104 moves it may enter and leave the service area provided by the wireless network access point 102. In addition, the service area provided by the wireless network access point 102 may vary dynamically, so that the mobile computing device 104 may enter and leave the service area even when motionless.

The obstacles 106, 108, 110 may correspond to physical structures or any phenomena capable of causing distortions to wireless communication media, for example, an electromagnetic field. The wireless communication media distortions caused by the obstacles 106, 108, 110 may be static or change dynamically with time. The obstacles 106, 108, 110 have different shapes in FIG. 1 to indicate that corresponding wireless communication media distortions may have a variety of sources.

Figure 2:
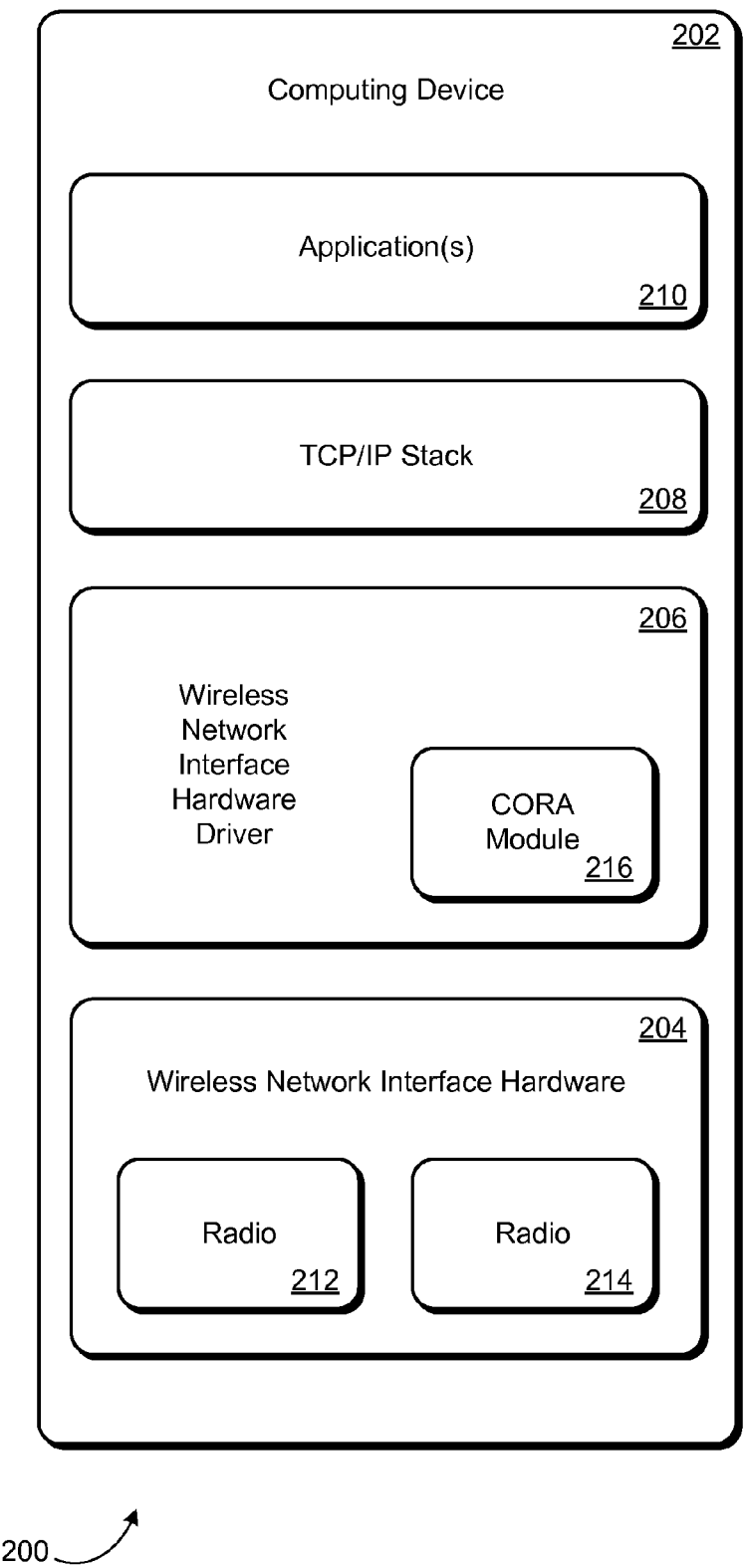
FIG. 2 is a block diagram depicting an example architecture for a mobile computing device incorporating correlation-based rate adaptation in accordance with an embodiment of the invention.

The combination of obstacles 106, 108, 110 causing distortions to wireless communication media and the motion of the mobile computing device 104 results in a scenario that can quickly become theoretically intractable, but which has correspondences with the complex and/or rapidly changing communication environment within which practical mobile computing devices operate. In an embodiment of the invention, the mobile computing device 104 may enhance communication performance in such an environment using correlation-based rate adaptation. FIG. 2 depicts an example architecture 200 for a mobile computing device 202 incorporating correlation-based rate adaptation in accordance with an embodiment of the invention. The example architecture 200 is a suitable architecture for the mobile computing device 104 (FIG. 1).

The mobile computing device 202 may include wireless network interface hardware 204, a wireless network interface hardware driver 206, a transmission control protocol and internet protocol (TCP/IP) stack 208, and one or more applications 210 that make use of the communication facilities provided by the other mobile computing device 202 components 204, 206, 208. In this example architecture 200, the wireless network interface hardware 204 includes two radios 212, 214 for transmitting and/or receiving data. However, each embodiment of the invention is not so limited and the wireless network interface hardware 204 may include any suitable number of radios and/or radio antennas including one. In an embodiment of the invention, the wireless network interface hardware driver 206 includes a correlation-based rate adaptation (CORA) module 216. However, each embodiment of the invention is not so limited and the correlation-based rate adaptation module 216 may be located within any suitable component of the architecture 200.

The wireless network interface hardware 204 may use the multiple radios 212, 214 to participate in multiple-input multiple-output (MIMO) wireless communication, for example, in accordance with one of the IEEE® 802.11n series of wireless communication standards. The wireless network access point 102 (FIG. 1) may also participate in compatible multiple-input multiple-output wireless communication. In an embodiment of the invention, use of multiple-input multiple-output wireless communication introduces a spatial encoding parameter in addition to other encoding parameters, such as modulation scheme and convolution coding rate, that are able to influence communication link quality. This enhanced set of parameters provides a source of helpful examples in this description.

It has become common for modern computer operating systems to employ device drivers to mediate between specialized hardware and other computer components. The wireless network interface hardware driver 206 may serve in such a role for an operating system of the mobile computing device 202. The example architecture 200 includes the TCP/IP stack 208 to provide data transport and networking functionality, for example, in accordance with transport and network layers of the International Organization for Standardization (ISO®) Open Systems Interconnection (OSI) Basic Reference Model as described in Zimmermann, "OSI Reference Model—The ISO Model of Architecture for Open Systems Interconnection," IEEE Transactions on Communications, April 1980. However, each embodiment of the invention is not so limited, and the mobile computing device 202 may utilize any suitable communication protocol stack providing such functionality. The application(s) 210 may be any suitable computing application(s) utilizing network communication.

In an embodiment of the invention, the quality of communication links in a given communication scheme may be influenced by each of a set of adjustable communication scheme parameters. The communication scheme parameters need not be independent of each other. For example, ones of the parameters may be constrained within certain ranges depending upon values of others of the parameters, and a particular parameter's influence on link quality may depend on values of other parameters. The communication scheme may even require that parameter values are set according to a relatively small set of standard parameter vectors. Nevertheless, in an embodiment of the invention, certain subsets of the parameters are at least somewhat independent and may be considered as defining a multi-dimensional parameter space. A particular example in accordance with an IEEE® 802.11n standard will be helpful.

TABLE 1

| | | Adjustable Parameters | | |
|---|---|---|---|---|
| MCS | NSS | Modulation | Coding Rate | Data Rate |
| 1 | 1 | QPSK | ½ | 13 Mbps |
| 3 | 1 | 16-QAM | ½ | 26 Mbps |
| 4 | 1 | 16-QAM | ¾ | 39 Mbps |
| 5 | 1 | 64-QAM | ⅔ | 52 Mbps |
| 8 | 2 | BPSK | ½ | 13 Mbps |
| 9 | 2 | QPSK | ½ | 26 Mbps |
| 10 | 2 | QPSK | ¾ | 39 Mbps |
| 11 | 2 | 16-QAM | ¾ | 52 Mbps |

Table 1 shows example standard parameter vectors in accordance with an IEEE® 802.11n communication scheme as well as a nominal data rate corresponding to each parameter vector. Each parameter vector is a 3-tuple with parameters: number of spatial streams (NSS), signal modulation scheme (modulation), and convolution coding rate (coding rate). Each parameter vector has an associated communication scheme index named modulation and coding scheme (MCS). For example, the parameter vector <NSS, modulation, coding rate> with values <1, 16-QAM, 1/2> has a corresponding data rate of 26 Mbps and an MCS index number of 3.

Signal modulation and convolution coding for wireless communication purposes are well know to those of skill in the art and need not be described here in detail. The number of spatial streams corresponds to a number of spatially independent wireless transmitters utilized when encoding data. Multiple spatial streams allows for spatial multiplexing for throughput increase and/or spatial diversity and redundancy for enhanced transmission reliability, for example, using space-time block coding (STBC). In particular, redundancy may be increased, for example, in response to a poor communication environment, at a cost of throughput by allocation of spatial stream resources.

The MCS index has a one-to-one correspondence with available parameter vectors, i.e., parameter vectors not corresponding to some MCS index number are not available in the example communication scheme. However, in this example, different parameter vectors have same corresponding nominal data rates. That is, for a given target data rate, there is a set of parameter vectors which may be selected from, for example, to enhance other aspects of communication link quality, to increase a probability of achieving the nominal data rate and/or in response to the present communication environment. In this example, to be further expounded below, the number of spatial streams and/or space-time block coding scheme (NSS_STBC), and the signal modulation scheme and convolution coding rate (MOD_CR) may be considered as somewhat independent parameter subsets corresponding to dimensions of a two dimensional parameter space.

The correlation-based rate adaptation module 216 (FIG. 2) may select and adjust adjustable communication scheme parameters and/or parameter space dimensions in response to a complex and dynamic communication environment. The correlation-based rate adaptation module 216 may determine one or more metrics associated with communication link quality, and base the selection and adjustment on determined correlations between the metric(s) and the adjustable communication scheme parameters and/or parameter space dimensions. In relation to the parameter space, the determined correlations may be considered correlation maps used to guide the selection and adjustment. In particular, the correlation-based rate adaptation module 216 may select and adjust communication scheme parameters and/or parameter space dimensions dynamically determined to have a highest correlation with communication link quality.

Figure 3:
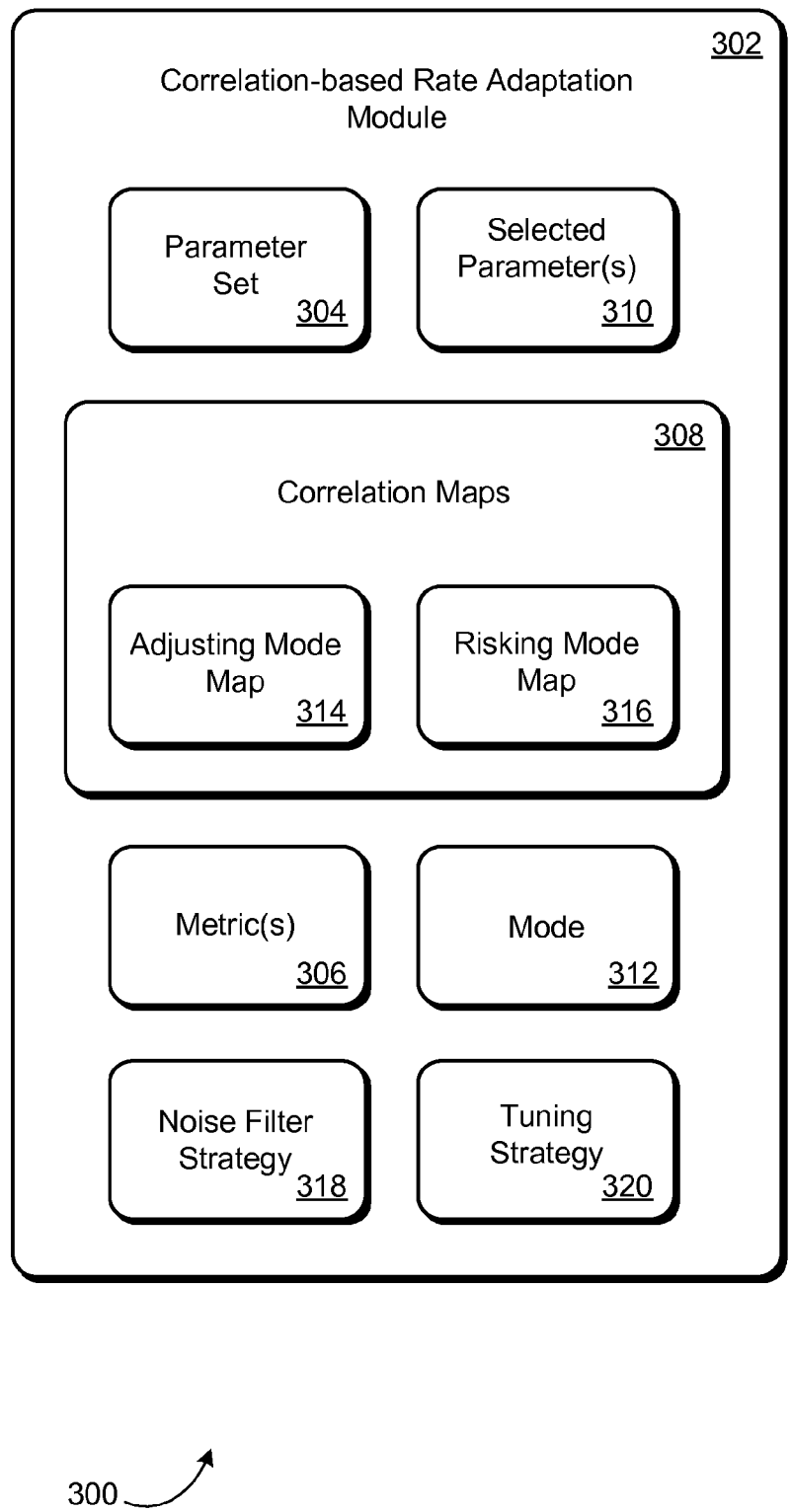
FIG. 3 is a block diagram depicting an example architecture for a correlation-based rate adaptation module in accordance with an embodiment of the invention.

It will be helpful to describe aspects of the correlation-based rate adaptation module 216 in more detail. Accordingly, FIG. 3 depicts an example architecture 300 for a correlation-based rate adaptation module 302 in accordance with an embodiment of the invention. The correlation-based rate adaptation module 302 is an example of the correlation-based rate adaptation module 216 (FIG. 2).

The correlation-based rate adaptation module 302 may include a set of adjustable (e.g., tunable) communication scheme parameters (parameter set) 304 associated with a particular communication scheme. For example, continuing the IEEE® 802.11n communication scheme example introduced above, the parameter set 304 may include the NSS_STBC parameter and the MOD_CR parameter. The correlation-based rate adaptation module 302 may further include one or more communication link performance and/or quality metrics (metrics) 306 with which to measure results of adjustments to the parameters of the parameter set 304. The metric(s) 306 may include any suitable communication scheme metric(s), for example, communication variables, communication results, communication events, communication statistics, specific to particular communication links, common to multiple communication links, measured results, sampled results, information available from the wireless network interface hardware 204 (FIG. 2), and/or suitable combinations thereof. In an embodiment of the invention, the metric(s) 306 include metrics based on consecutive occurrences of particular types of transmission, for example, consecutive transmission failures and consecutive transmission successes, and may be adjusted for transmission packet length, and filtered, for example, to reduce noise.

The correlation-based rate adaptation module 302 may further include one or more correlation maps 308 corresponding to one or more correlations between elements of the parameter set 304 and the metric(s) 306. The parameter set 304 may be considered as defining a k-dimensional parameter space. A correlation map of the correlation maps 308 may include a correlation value for each point of the parameter space. However, each embodiment of the invention is not so limited, and correlation maps may have any suitable granularity. In particular, parameters of the parameter set 304 defining the parameter space may be quantized and/or constrained to parameter vector values by the corresponding communication scheme, and, for example, correlation map values may correspond to parameter vector values. In an embodiment of the invention, a single correlation value is maintained for each tunable dimension of the parameter space.

A particular correlation value may correspond to one or more metric thresholds. For example, a metric value above (or, alternatively, below) a particular metric threshold may be classified as correlative. A distance from the metric value to the metric threshold may correspond to a degree of correlation. In an embodiment of the invention, ones of the correlation maps 308 include a metric threshold corresponding to each tunable dimension of the parameter space. If the tunable parameters of the parameter set 304 are considered as an ordered k-tuple, a corresponding set of metric thresholds may be similarly considered as an ordered k-tuple.

The correlation maps 308 may be used by the correlation-based rate adaptation module 302 to determine a highly and/or most correlative parameter (or subset) of the parameter set 304. For example, the correlation-based rate adaptation module 302 may search one or more of the correlation maps 308 to determine one or more parameters of the parameter set 304 corresponding to high and/or highest correlation values. In an embodiment of the invention, a most correlative parameter of the parameter set 304 corresponds to a lowest (or, alternatively, highest) associated metric threshold.

The correlation-based rate adaptation module 302 may focus on optimizing (e.g., adjusting to enhance communication performance) some subset (e.g., one) of the parameter set 304 at any one time. A selected parameter(s) 310 module may reference the subset of the parameter set 304 that are currently selected by the correlation-based rate adaptation module 302 for optimization. In an embodiment of the invention, the selected parameter(s) 310 correspond to highly and/or most correlative parameters of the parameter set 304, for example, as indicated by the correlation maps 308.

The correlation-based rate adaptation module 302 may have multiple modes of operation (e.g., states). For example, the modes of operation of the correlation-based rate adaptation module 302 may correspond to operating regimes of the communication scheme associated with the parameter set 304. The correlation-based rate adaptation module 302 may include a mode module 312 that manages and/or explicitly references a current mode of operation of the correlation-based rate adaptation module 302.

In an embodiment of the invention, modes of operation of the correlation-based rate adaptation module 302 include an initializing mode, an adjusting mode and a risking mode. For example, the adjusting mode may correspond to a mode of operating in which the correlation-based rate adaptation module 302 adjusts the selected parameter(s) 310 to reduce a frequency of transmission failure events, and the risking mode may correspond to a mode of operation in which the correlation-based rate adaptation module 302 adjusts the selected parameter(s) 310 to increase throughput. The adjusting mode may be activated in response to a communication scheme operating regime with a significant level of communication failure, and the risking mode may be activated in response a communication scheme operating regime with a significant level of communication success. Further details with respect to adjusting and risking modes are described below with reference to FIG. 4.

As described below in more detail, the metric(s) 306 may be used to adjust the correlation maps 308. The choice of the metric(s) 306 and the correlation maps 308 may depend upon the mode of operation of the correlation-based rate adaptation module 302. To continue the adjusting and risking mode example, when in the adjusting mode, the metric(s) 306 may include a metric based on consecutive transmission failures, and when in risking mode, the metric(s) 306 may include a metric based on consecutive transmission successes. In an embodiment of the invention, one or more metric thresholds associated with the correlation maps 308 are adjusted based on the metric(s) 306 and the correlation-based rate adaptation module 302 mode of operation.

In the example correlation-based rate adaptation module 302, the correlation maps 308 include an adjusting mode map 314 and a risking mode map 316. The adjusting mode map 314 may be used by the correlation-based rate adaptation module 302 during the adjusting mode of operation, and the risking mode map 316 may be used during the risking mode of operation. However, each embodiment of the invention is not so limited, and correlation-based rate adaptation modules in accordance with an embodiment of the invention may include any suitable number of correlation maps, including a single correlation map used by each mode of the correlation-based rate adaptation module 302. Furthermore, plural correlation maps may be virtual, that is, logically and/or semantically distinct although implemented with a single data object, for example, the same data object may represent different correlation maps 308 at different moments.

In particular, the metric(s) 306, the correlation maps 308 and the selected parameter(s) 310 may each have some dependency on the mode of operation of the correlation-based rate adaptation module 302. Transitions between modes (to the extent that they are explicit) may therefore affect correlation-based rate adaptation module 302 performance. Transitions between modes may be triggered by events and/or signals monitored by the correlation-based rate adaptation module 302, for example, transmission failure and/or success events. Such monitored events and/or signals may include spurious, random and/or noise components. The correlation-based rate adaptation module 302 may filter monitored events and/or signals to reduce the spurious, random and/or noise components. The correlation-based rate adaptation module 302 may include a noise filter strategy module 318 that performs such filtering. The noise filter strategy module 318 may include one or more filtering strategies, for example, corresponding to correlation-based rate adaptation module 302 modes of operation. Filtering strategies may be first class programmatic objects.

As described below in more detail, the correlation-based rate adaptation module 302 may adjust the selected parameter(s) 310 to enhance performance of corresponding communication scheme. The correlation-based rate adaptation module 302 may employ one or more tuning strategies in adjusting the selected parameter(s) 310, for example, corresponding to correlation-based rate adaptation module 302 modes of operation. The correlation-based rate adaptation module 302 may include a tuning strategy module 320 to perform, manage and/or reference such tuning strategies. Tuning strategies may be first class programmatic objects.

Figure 4:
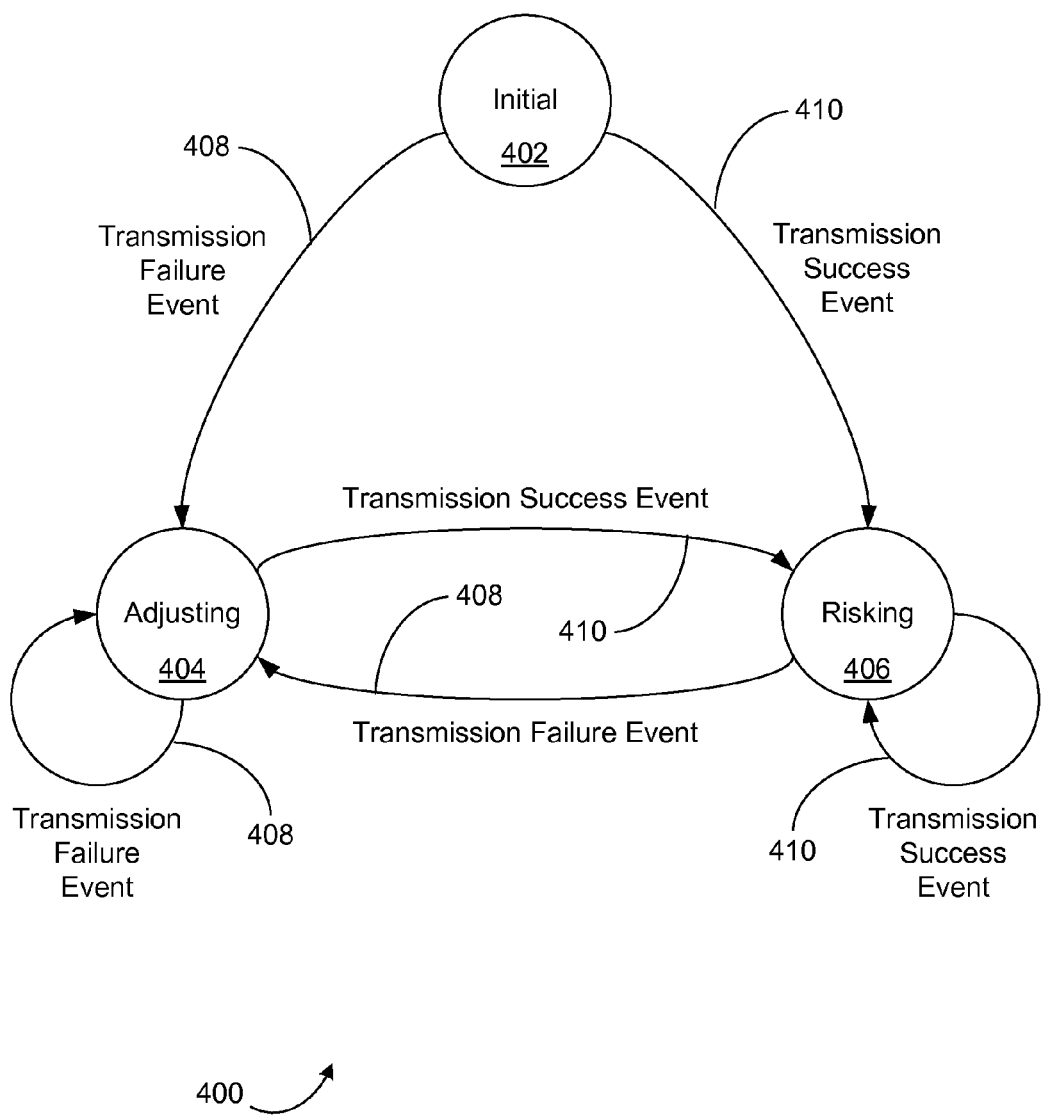
FIG. 4 is a state diagram for the correlation-based rate adaptation module depicted in FIG. 3.

Modes of operation of the correlation-based rate adaptation module 302 may be well-defined, that is, the correlation-based rate adaptation module 302 may begin in a particular mode of operation and transition to other modes of operation under well-defined conditions. FIG. 4 depicts an example mode or state diagram 400 for the correlation-based rate adaptation module 302 (FIG. 3) and like communication participants in accordance with an embodiment of the invention. The correlation-based rate adaptation module 302 may begin in an initial or initialization mode 402 and transition to one of an adjusting mode 404 or a risking mode 406. The correlation-based rate adaptation module 302 may transition from the initial mode 402 to the adjusting mode 404 upon detection of a transmission failure event 408, and the correlation-based rate adaptation module 302 may transition from the initial mode 402 to the risking mode 404 upon detection of a transmission success event 410.

Transmission failure events 408 and transmission success events 410 may be detected and/or generated by the mode module 312 (FIG. 3). Detection of the transmission failure event 408 may include detection of one or more packet transmission failures, for example, failure to receive a corresponding acknowledgement packet within a specified timeout period. Similarly, detection of the transmission success event 410 may include detection of one or more packet transmission successes, for example, receipt of a corresponding acknowledgement packet. Detection of the transmission failure event 408 and/or the transmission success event 410 may utilize one or filtering strategies, for example, of the noise filter strategy module 318. As a further filtering strategy, the correlation-based rate adaptation module 302 may transition to the initial mode 402 from the adjusting mode 404 or risking mode 406, for example, after a specified time period, in order to clear obsolete communication history and/or reset associated communication statistics.

When in the adjusting mode 404, the correlation-based rate adaptation module 302 (FIG. 3) may transition to the risking mode 406 upon detection of the transmission success event 410. Upon detection of the transmission failure event 408, the correlation-based rate adaptation module 302 may remain in or reenter the adjusting mode 404. Similarly, the correlation-based rate adaptation module 302 may remain in or reenter the risking mode 406 upon detection of the transmission success event 410. When in the risking mode 406, the correlation-based rate adaptation module 302 may transition to the adjusting mode 404 upon detection of the transmission failure event 408. In general, transmission failures may encourage the correlation-based rate adaptation module 302 to transition to the adjusting mode 404, whereas transmission successes may encourage transition to the risking mode 406.

Figure 5:
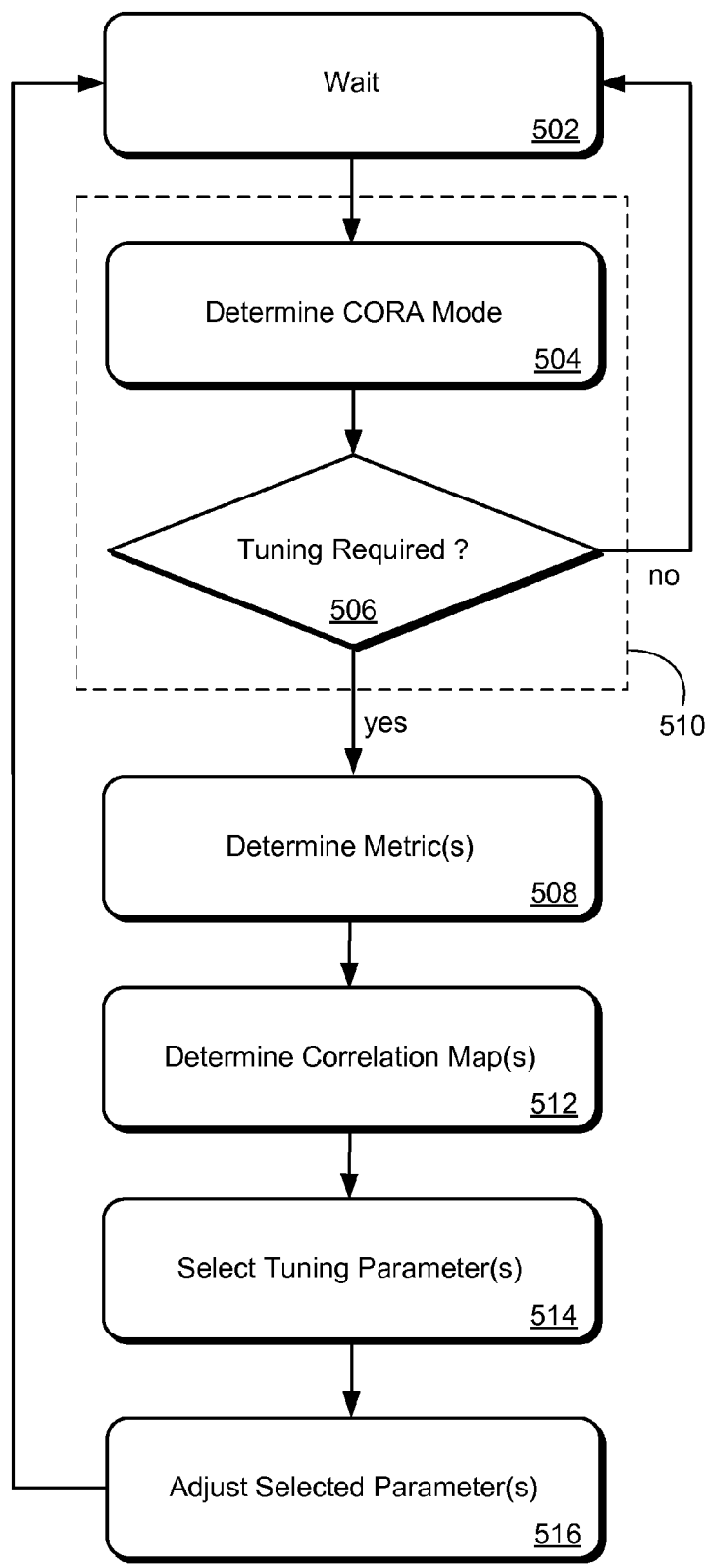
FIG. 5 is a flowchart depicting example steps for correlation-based rate adaptation in accordance with an embodiment of the invention.

Having described structural aspects of architectures 200, 300 (FIGS. 2 and 3) in accordance with an embodiment of the invention, the description now turns to corresponding methods and instructions that may be performed. FIG. 5 depicts example steps that may be performed for correlation-based rate adaptation in accordance with an embodiment of the invention. At step 502, a procedure incorporating steps depicted by FIG. 5 may wait. For example, a thread of execution of the procedure may wait on an event and/or signal. The waiting time may be a specified wait and/or timeout period, and may be interrupted by the event and/or signal.

At step 504, a correlation-based rate adaptation (CORA) mode may be determined. For example, the current mode of operation of the correlation-based rate adaptation module 302 (FIG. 3) may be explicitly determined by the mode module 312. In an embodiment of the invention, the current mode may be determined to be one of the initializing mode 402 (FIG. 4), the adjusting mode 404 and the risking mode 406. At step 506, it may be determined if tuning of communication scheme parameters is required. For example, the correlation-based rate adaptation module 302 may utilize filtering strategies of the noise filter strategy module 318 to determine whether the selected parameter(s) 310 require adjustment and/or are able to be adjusted to enhance an aspect of performance of the corresponding communication scheme. If it is determined that tuning of communication scheme parameters is desirable, the procedure may progress to step 508. Otherwise, the procedure may return to step 502 for a further wait period, for example, to wait for further information. In an embodiment of the invention, steps 504 and 506 are integral as indicated by dashed line 510. Example steps for integrally performing steps 510 are described below in more detail with reference to FIG. 6.

At step 508, one or more metrics may be determined. For example, the correlation-based rate adaptation module 302 (FIG. 3) may update the metric(s) 306 using information from the wireless network interface hardware 204 (FIG. 2) and/or the wireless network interface hardware driver 206. In an embodiment of the invention, a first metric $M_{risking}$ is calculated for the risking mode 406 (FIG. 4) as follows:

$$M_{risking} = \sum_{i=1}^{SuccNum} Pkt\_Len_i / MTU\_LEN$$

where SuccNum is a number of consecutive successful transmissions (e.g., consecutive acknowledged data packets transmitted since transitioning to the risking mode 406 of FIG. 4), Pkt_Len$_i$ is a length of an i$^{th}$ transmission packet (e.g., i$^{th}$ in the sequence of successful transmissions), and MTU_LEN is a maximum packet length (e.g., a maximum media access control or MAC layer transfer unit length). That is, the first metric M$_{risking}$ may be a sum of consecutive successful transmissions, weighted according to transmission packet length and normalized with respect to a maximum packet length. Furthermore, a second metric M$_{adjusting}$ may be calculated for the adjusting mode 404 as follows:

$$M_{adjusting} = \sum_{i=1}^{FailureNum} MTU\_LEN/Pkt\_Len_i$$

where FailureNum is a number of consecutive failed transmissions (e.g., consecutive unacknowledged data packets since transitioning to the adjusting mode 404 of FIG. 4), Pkt_Len$_i$ is a length of an i$^{th}$ transmission packet (e.g., i$^{th}$ in the sequence of failed transmissions), and MTU_LEN is the maximum packet length as for the first metric M$_{risking}$. That is, the second metric M$_{adjusting}$ may be a sum of consecutive failed transmissions, weighted inversely according to transmission packet length and normalized with respect to a maximum packet length.

At step 512, one or more correlation maps may be determined. For example, the correlation-based rate adaptation module 302 (FIG. 3) may update the correlation maps 308 based on the metric(s) 306. In an embodiment of the invention, one or more metric thresholds of the correlation maps 308 are adjusted based on the current mode of operation of the correlation-based rate adaptation module 302 and the selected parameter(s) 310. For example, a particular metric threshold associated with the selected parameter(s) 310 may be increased if the current mode of operation of the correlation-based rate adaptation module 302 is adjusting 404 (FIG. 4) or decreased if the current mode is risking 406. Example steps for determining correlation maps are described below in more detail with reference to FIGS. 7 and 8.

In an embodiment of the invention, increasing the metric threshold reduces a probability that an associated one of the parameter set 304 (FIG. 3) will be selected for tuning by the correlation-based rate adaptation module 302, and decreasing the threshold increases the probability. However, each embodiment of the invention is not so limited, and decreasing the metric threshold may alternatively increase the probability of the associated communication scheme parameter being selected, and increasing the metric may decrease the probability. Communication scheme parameters with a low probability of being selected (e.g., as determined by the correlation maps 308 and/or the metric thresholds thereof) may be considered as non-correlative, while those with a high probability of being selected may be considered as correlative. In an embodiment of the invention, tuning correlative communication scheme parameters in preference to non-correlative communication scheme parameters enhances communication performance.

At step 514, one or more communication scheme parameters may be selected for tuning. For example, the correlation-based rate adaptation module 302 (FIG. 3) may set tunable ones of the parameter set 304 as the selected parameter(s) 310 based on one or more of the correlation maps 308. In an embodiment of the invention, a most correlative one of the parameter set 304 is selected for tuning, for example, most correlative with desirable communication operating regimes such as operating regimes prevalent when the correlation-based rate adaptation module 302 is operating in the risking mode 406 (FIG. 4). Alternatively, ones of the parameter set 304 may be selected for tuning that are least correlative with undesirable communication operating regimes such as operating regimes prevalent when the correlation-based rate adaptation module 302 is operating in the adjusting mode 404. Example steps for selecting tuning parameters are described below in more detail with reference to FIG. 9.

At step 516, the communication scheme parameter(s) selected at step 514 may be adjusted. For example, the correlation-based rate adaptation module 302 (FIG. 3) may adjust the selected parameter(s) 310 and/or adjustable aspects of the wireless network interface hardware 204 (FIG. 2) and/or the wireless network interface hardware driver 206 corresponding to the selected parameter(s) 310 in accordance with one or more tuning strategies of the tuning strategy module 320. In an embodiment of the invention, tuning strategies may include tuning the selected parameter(s) 310 based on the current mode of operation of the correlation-based rate adaptation module 302, mapping desired parameter values to available parameter values (e.g., as constrained by the wireless network interface hardware 204, the wireless network interface hardware driver 206 and/or the corresponding communication scheme), delegation to established tuning modules, and/or suitable combinations thereof. Example steps for adjusting selected parameters are described below in more detail with reference to FIGS. 10 and 11. Having adjusted the selected parameter(s), the procedure may return to step 502 to wait for the results of the tuning.

The steps depicted by FIG. 5 provide for a communication parameter selection and tuning loop that adjusts communication parameters according to determined correlations between adjustment actions and observed transmission results. In an embodiment of the invention, adjustment of communication scheme in this more atomic manner (e.g., in contrast to simple or blind rate adjustment) provides for more efficient tuning. In particular, unnecessary rate fallback may be reduced, resulting in increased throughput. The description now turns to additional details of the steps depicted by FIG. 5. In particular, details corresponding to the helpful IEEE® 802.11n example introduced above are further described.

Figure 6:
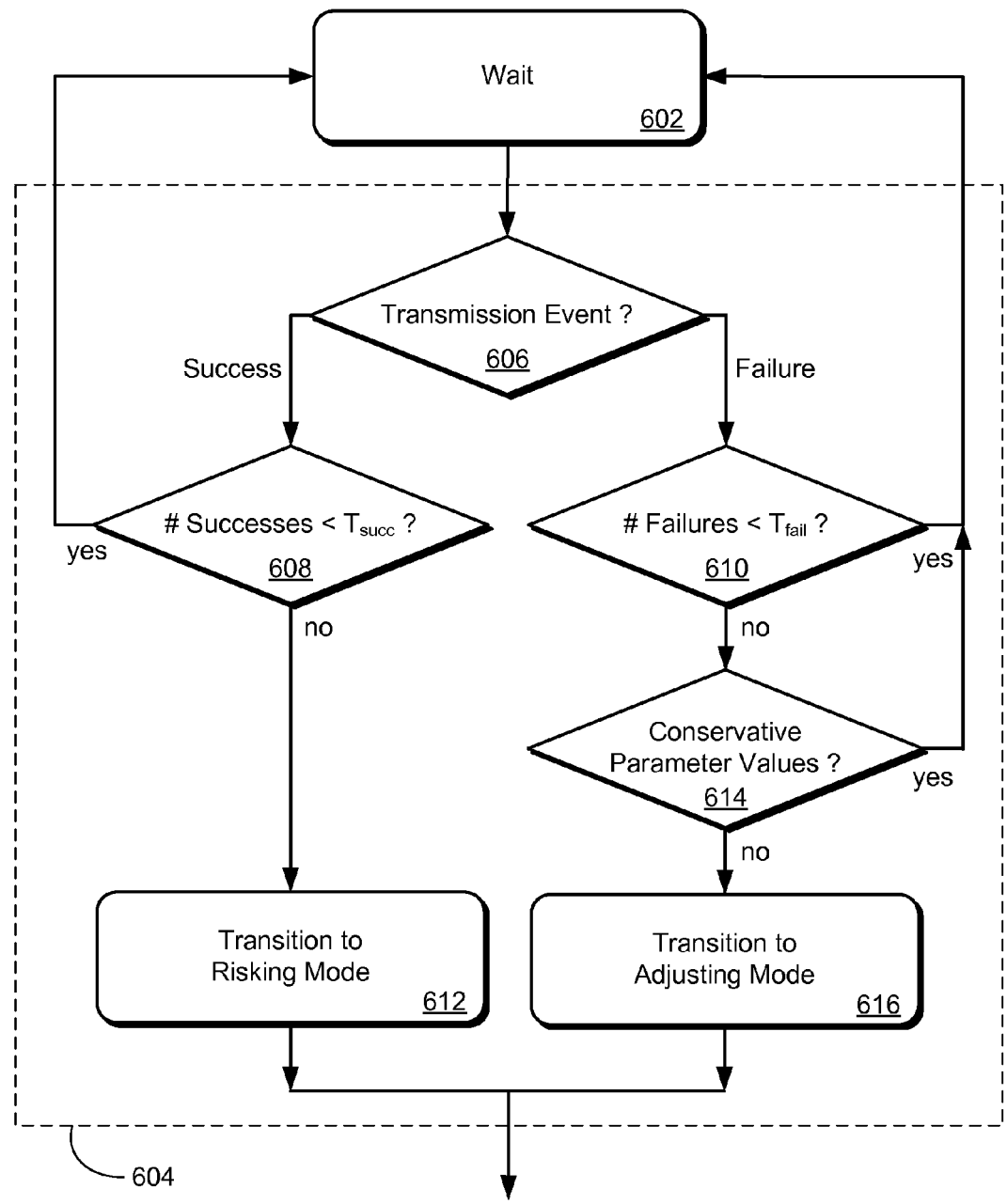
FIG. 6 is a flowchart depicting example steps for determining correlation-based rate adaptation mode and tuning requirement in accordance with an embodiment of the invention.

As described above with reference to steps 504 and 506, steps explicitly determining the mode of operation of the correlation-based rate adaptation module 302 (FIG. 3) and whether tuning actions are currently required may be integral. FIG. 6 depicts example steps for determining correlation-based rate adaptation mode and tuning requirement in accordance with an embodiment of the invention. In this example, the wait step 602 corresponds to the wait step 502 (FIG. 5) and the steps enclosed by the dashed line 604 correspond to the steps enclosed by the dashed line 510.

A procedure incorporating the steps depicted by FIG. 6 may progress from step 602 because of an event and/or signal, for example, a transmission event such as the transmission failure event 408 (FIG. 4) or the transmission success event 410. At step 606, it may be determined if a transmission event occurred. If a transmission success event 410 occurred, the procedure may progress to step 608. If a transmission failure event 408 occurred, the procedure may progress to step 610. Although not depicted in FIG. 6, other events and/or signals may cause the procedure to return to step 602 or proceed with parameter selection and adjustment, for example, by progressing to step 508 (FIG. 5). Returning to step 602 may correspond to a determination at step 506 that tuning of communication scheme parameters is not currently required.

At step 608, it may be determined if the number of consecutive successful transmissions (# Successes) is less than a consecutive successful transmissions threshold $T_{succ}$. If the number of consecutive successful transmissions is less than the threshold $T_{succ}$, then the procedure may return to step 602. Otherwise, the procedure may progress to step 612.

At step 612, the correlation-based rate adaptation module 302 (FIG. 3) may transition to risking mode 406 (FIG. 4). For example, the mode module 312 may transition the correlation-based rate adaptation module 302 to risking mode 406. The determining step 608 may prevent premature transition to risking mode 406, for example, due to event and/or signal noise. The determining step 608 may be part of a filtering strategy of the noise filter strategy module 318. Following the transition of step 612, the procedure may proceed with parameter selection and adjustment, for example, by progressing to step 508 (FIG. 5)

At step 610, it may be determined if the number of consecutive failed transmissions (# Failures) is less than a consecutive failed transmissions threshold $T_{fail}$. If the number of consecutive failed transmissions is less than the threshold $T_{fail}$, then the procedure may return to step 602. Otherwise, the procedure may progress to step 614.

At step 614, it may be determined whether communication scheme parameters currently have conservative values. For example, the correlation-based rate adaptation module 302 (FIG. 3) may determine if values of communication scheme parameters in the parameter set 304 lie within conservative ranges. In the IEEE® 802.11n communication scheme example, the values of the parameters in the parameter set 304 may correspond to a particular parameter vector with an associated MCS index number, and the correlation-based rate adaptation module 302 may determine if the associated MSC index number lies within a conservative range (e.g., less than 3). If it is determined that the communication scheme parameters have conservative values, the procedure may return to step 602. Otherwise, the procedure may progress to step 616.

At step 616, the correlation-based rate adaptation module 302 (FIG. 3) may transition to adjusting mode 404 (FIG. 4). For example, the mode module 312 may transition the correlation-based rate adaptation module 302 to adjusting mode 404. Together, the determining steps 610 and 614 may prevent premature transition to adjusting mode 404, for example, due to event and/or signal noise, and/or MAC layer collisions. Steps 610 and 614 may be part of a filtering strategy of the noise filter strategy module 318. Following the transition of step 616, the procedure may proceed with parameter selection and adjustment, for example, by progressing to step 508 (FIG. 5).

Figure 7:
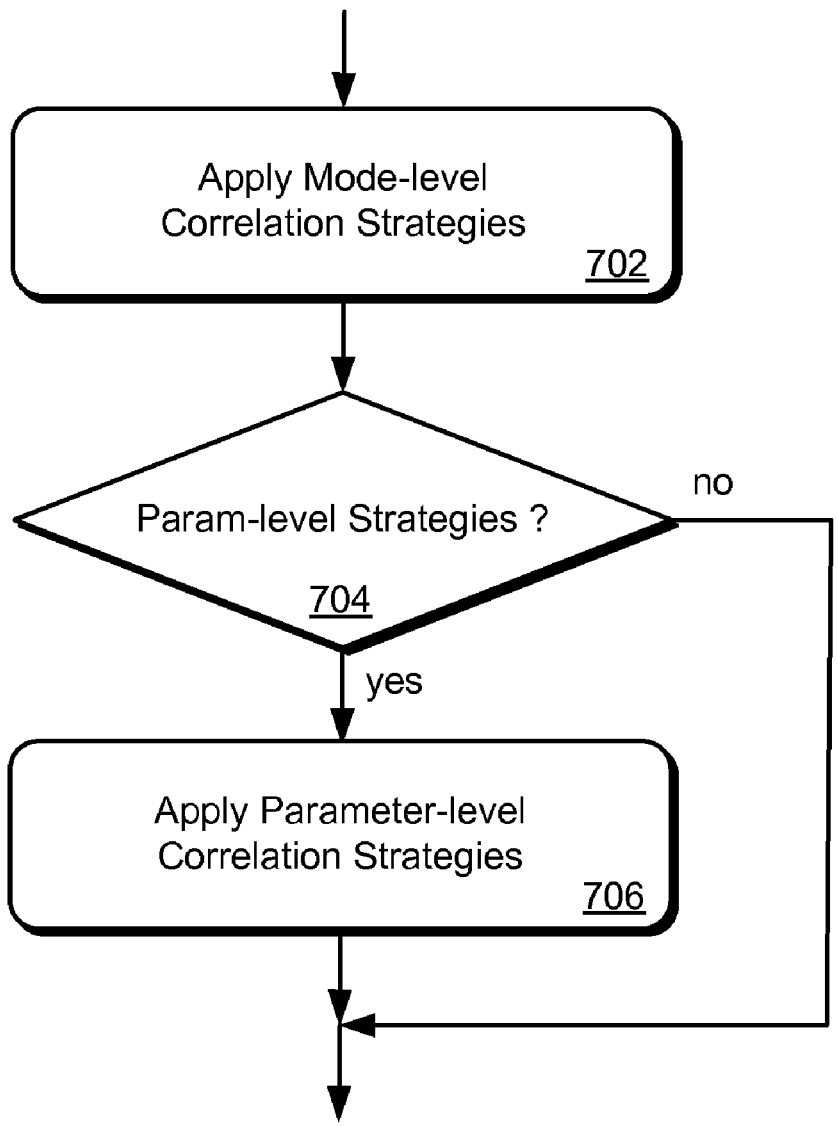
FIG. 7 is a flowchart depicting example steps for determining correlation maps in accordance with an embodiment of the invention.

In an embodiment of the invention, correlation maps 308 (FIG. 3) are utilized to determine the communication scheme parameter(s) 310 selected for adjustment. The correlation-based rate adaptation module 302 may include one or more correlation strategies for determining correlation maps 308. FIG. 7 depicts example steps for determining correlation maps in accordance with an embodiment of the invention.

At step 702, zero or more mode-level correlation strategies may be applied. For example, the correlation-based rate adaptation module 302 (FIG. 3) may adjust the correlation maps 308 based on the current mode of operation of the correlation-based rate adaptation module 302. At step 704, it may be determined if any parameter-level correlation strategies are applicable. For example, the correlation-based rate adaptation module 302 may determine if any of its parameter-level correlation strategies are applicable to the selected parameter(s) 310. If there are applicable parameter-level correlation strategies, a procedure incorporating the steps depicted in FIG. 7 may progress to step 706. Otherwise, the procedure may progress, for example, to parameter selection at step 514 (FIG. 5). At step 706, one or more parameter-level correlation strategies may be applied. For example, the correlation-based rate adaptation module 302 may adjust the correlation maps 308 based on the current selected parameter(s) 310.

Figure 8:
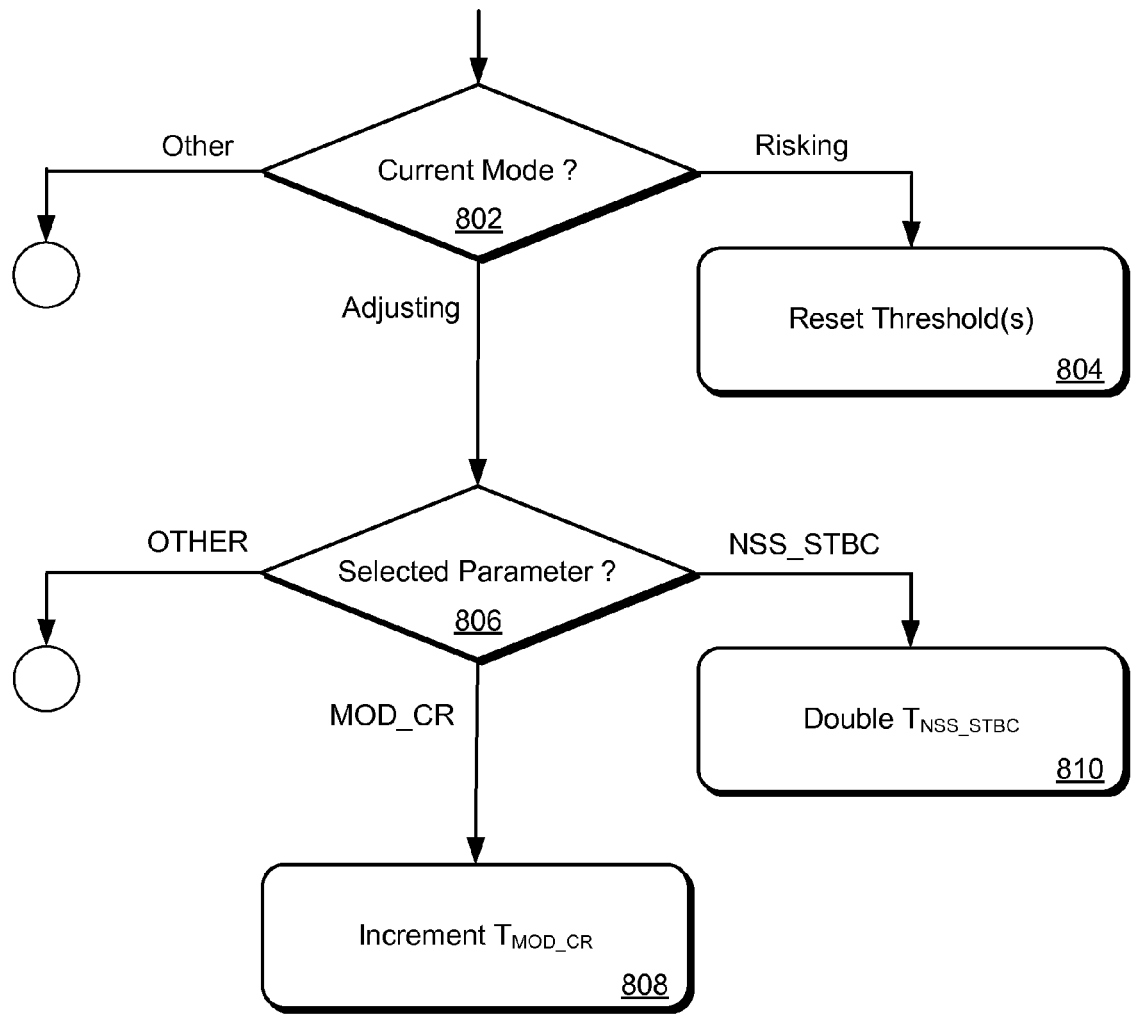
FIG. 8 is a flowchart depicting further example steps for determining correlation maps in accordance with an embodiment of the invention.

Before describing further details of parameter selection, it will be helpful to provide specific examples of mode-level and parameter-level correlation strategies that may be applied to correlation maps for an IEEE® 802.11n communication scheme. FIG. 8 depicts example steps implementing such correlation strategies in accordance with an embodiment of the invention.

At step 802, the current mode of operation may be determined. For example, the mode module 312 (FIG. 3) may determine and/or provide the current mode of operation of the correlation-based rate adaptation module 302. If it is determined that the current mode of operation is the risking mode 406 (FIG. 4), a procedure incorporating the steps depicted in FIG. 8 may progress to step 804. If it is determined that the current mode of operation is the adjusting mode 404, the procedure may progress to step 806. Otherwise, the procedure may progress, for example, to parameter selection at step 514 (FIG. 5).

As described above, the parameter set 304 (FIG. 3) for the IEEE® 802.11n communication scheme may include the MOD_CR parameter and the NSS_STBC parameter. Accordingly, the correlation maps 308 may each include at least two metric thresholds: a metric threshold $T_{MOD\_CR}$ corresponding to the MOD_CR parameter, and a metric threshold $T_{NSS\_STBC}$ corresponding to the NSS_STBC parameter. The threshold values $T_{MOD\_CR}$ and $T_{NSS\_STBC}$ for the adjusting mode map 314 and the risking mode map 316 may be initialized differently (e.g., 2 and 11). At step 804, one or more thresholds of the risking mode map 314 may be reset to their initial values. For example, the threshold(s) corresponding to the selected parameter(s) 310 may be reset to their initial values.

At step 806, the selected parameter 310 (FIG. 3) may be determined. For this example, the selected parameter 310 may be determined to be the MOD_CR parameter, the NSS_STBC parameter or some other parameter (OTHER). If the currently selected parameter 310 is the MOD_CR parameter, the procedure may progress to step 808. If the currently selected parameter 310 is the NSS_STBC parameter, the procedure may progress to step 810. Otherwise, the procedure may progress, for example, to parameter selection at step 514 (FIG. 5).

At step 808, the metric threshold $T_{MOD\_CR}$ corresponding to the MOD_CR parameter may be incremented. At step 808, the currently selected parameter 310 (FIG. 3) is MOD_CR, but the mode indicates that one or more transmission failure events have occurred. That is, previous adjustments to the MOD_CR parameter have not prevented transmission failure events. As described above, in an embodiment of the invention, raising the threshold $T_{MOD\_CR}$ lowers the probability that the MOD_CR parameter will be reselected for adjustment.

At step 810, the metric threshold $T_{NSS\_STBC}$ corresponding to the NSS_STBC parameter may be doubled. At step 810, the currently selected parameter 310 (FIG. 3) is NSS_STBC, but the mode indicates that one or more transmission failure events have occurred. That is, previous adjustments to the NSS_STBC parameter have not prevented transmission failure events. As described above, in an embodiment of the invention, raising the threshold $T_{NSS\_STBC}$ lowers the probability that the NSS_STBC parameter will be reselected for adjustment.

In this example, steps 802 and 804 may be considered as corresponding to steps 702 and 704 of FIG. 7. For example, step 804 may be considered as the application of a mode-level correlation strategy, and the determination of the current mode as risking mode 406 (FIG. 4) at step 802 determines that there are no further parameter-level correlation strategies requiring application. However, determination of the current mode as adjusting mode 404 at step 802 may be considered to determine that parameter-level correlation strategies are required, and steps 806, 808 and 810 may then be considered as the application of parameter-level correlation strategies. In this example, the parameter-level correlation strategy for the metric threshold $T_{NSS\_STBC}$ corresponding to the NSS_STBC parameter is more severe than the parameter-level correlation strategy for the metric threshold $T_{MOD\_CR}$ corresponding to the MOD_CR parameter. Such differences in correlation strategies may correspond to theoretical and/or empirical observations with respect to an influence of a given parameter on communication link quality.

Figure 9:
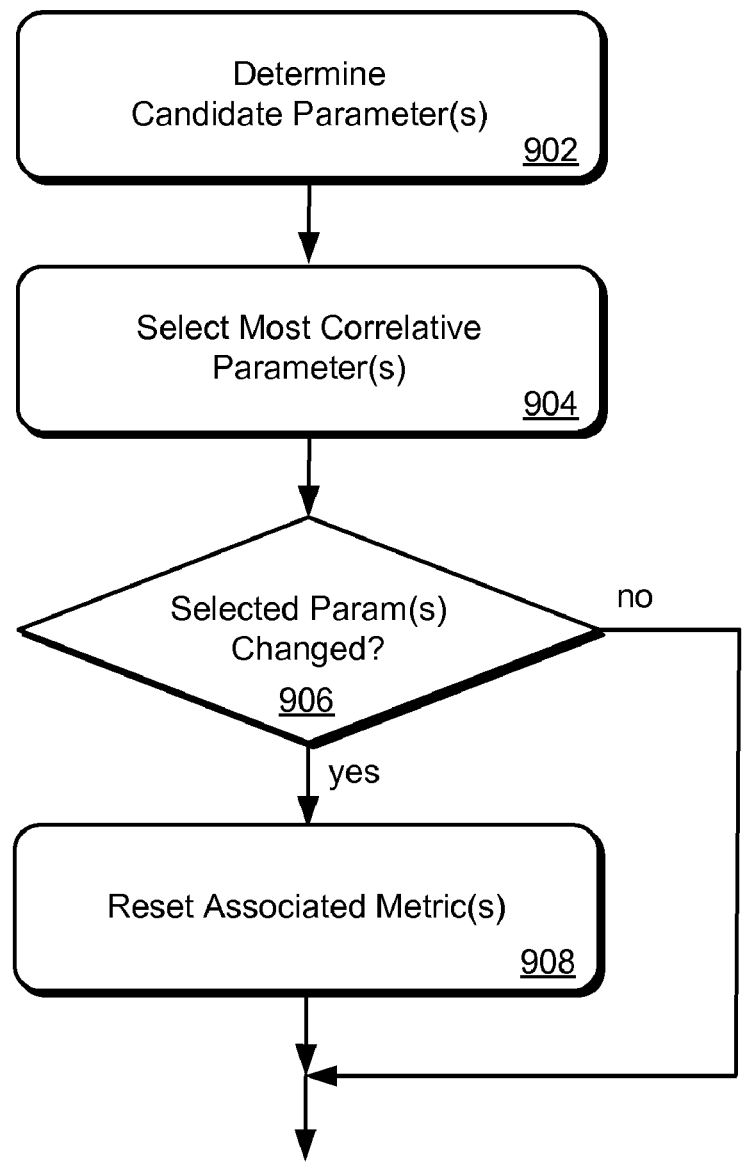
FIG. 9 is a flowchart depicting example steps for selecting tuning parameters in accordance with an embodiment of the invention.

Having updated the correlation maps 308 (FIG. 3) to take into account previous tunings of the currently selected parameter(s) 310, the selected parameter(s) 310 may be updated based on those new correlation maps 308. FIG. 9 depicts example steps for selecting tuning parameters in accordance with an embodiment of the invention. At step 902, a candidate set of parameters may be determined. For example, the correlation-based rate adaptation module 302 may determine which of the tunable parameters in the parameter set 304 are candidates to become the currently selected parameter(s) 310 for tuning. In an embodiment of the invention, candidate parameters are those communication scheme parameters having corresponding metric thresholds in the correlation maps 308 with values lower than current associated metric(s) 306 values.

At step 904, one or more most correlative parameters of the candidate set may be selected. For example, the correlation-based rate adaptation module 302 (FIG. 3) may select a parameter of the candidate set having a lowest associated metric threshold in one of the correlation maps 308. The selected parameter(s) 310 may be updated accordingly. At step 906, it may be determined if the selected parameter(s) 310 update changed the selected parameter(s) 310. If the update did change the selected parameter(s) 310, a procedure incorporating the steps depicted by FIG. 9 may progress to step 908. Otherwise, the procedure may progress, for example, to step 516 (FIG. 5). At step 908, one or more metrics associated with the newly selected parameter(s) 310 may be reset. For example, the correlation-based rate adaptation module 302 may clear an event history and/or log associated with ones of the metric(s) 306, or zero associated cumulative variables.

Figure 10:
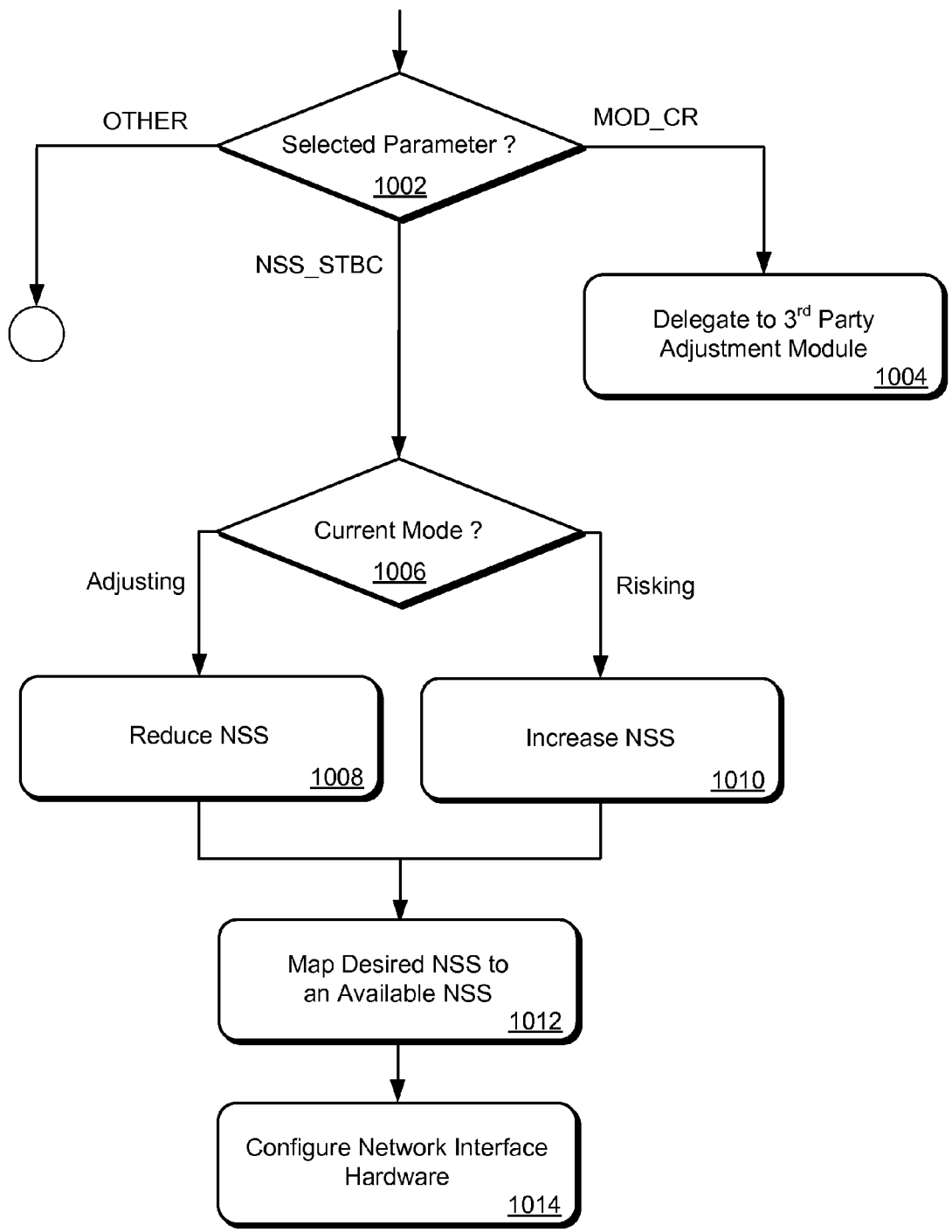
FIG. 10 is a flowchart depicting example steps for adjusting selected parameters in accordance with an embodiment of the invention.

Having updated the selected parameter(s) 310 (FIG. 3) in accordance with the correlation maps 308, the selected parameter(s) 310 may be tuned, for example, in accordance with one or more tuning strategies of the tuning strategy module 302. FIG. 10 depicts example steps for adjusting selected parameters in accordance with an embodiment of the invention. At step 1002, a selected parameter may be determined. Continuing the IEEE® 802.11n example, the selected parameter 310 may be determined to be the MOD_CR parameter, the NSS_STBC parameter or some other parameter (OTHER). If the selected parameter 310 is the MOD_CR parameter, a procedure incorporating steps depicted by FIG. 10 may progress to step 1004. If the currently selected parameter 310 is the NSS_STBC parameter, the procedure may progress to step 1006. Otherwise, no communication scheme parameter adjustment is required, and, for example, the procedure may return to the beginning of the select and adjust loop (i.e., step 502 of FIG. 5).

Adjustment of signal modulation scheme and convolution coding rate (i.e., the MOD_CR parameter) to enhance communication performance is well known in the art and need not be described here in detail. Suitable adjustment procedures may be provided by an established $3^{rd}$ party adjustment module, for example, incorporated into the wireless network interface hardware 204 (FIG. 2), the wireless network interface hardware driver 206, or any suitable component of the mobile computing device 202. Accordingly, at step 1004, adjustment of the MOD_CR parameter may be delegated to the $3^{rd}$ party adjustment module.

At step 1006, the current mode of operation may be determined. For example, the mode module 312 (FIG. 3) may determine and/or provide the current mode of operation of the correlation-based rate adaptation module 302. If it is determined that the current mode of operation is the adjusting mode 404 (FIG. 4), the procedure may progress to step 1008. If it is determined that the current mode of operation is the risking mode 406, the procedure may progress to step 1010. Otherwise, adjustment of the NSS_STBC parameter is not currently required, and, for example, the procedure may return to the beginning of the select and adjust loop (i.e., step 502 of FIG. 5).

At step 1008, a number of spatial streams (NSS) may be reduced. For example the correlation-based rate adaptation module 302 (FIG. 3) may target a reduction in the number of spatial streams associated with the NSS_STBC parameter if the current number of spatial stream is above a minimum number of spatial streams (e.g., 1). Similarly, at step 1010, a number of spatial streams (NSS) may be increased. For example the correlation-based rate adaptation module 302 may target an increase in the number of spatial streams associated with the NSS_STBC parameter if the current number of spatial stream is below a maximum number of spatial streams.

The desired number of spatial streams, for example, as determined by step 1008 or 1010, may not be available within the context of a particular communication scheme, and, in particular, may not be available in combination with given values of other parameters in the communication scheme parameter set 304 (FIG. 3). Accordingly, at step 1012, the desired number of spatial streams may be mapped to an available number of spatial streams. For example, if an exact match is not available, the correlation-based rate adaptation module 302 may determine a suitable match from among a set of available parameter vectors of the communication scheme. Example steps for making such a determination are described below in more detail with reference to FIG. 11.

At step 1014, network interface hardware participating in the communication scheme may be configured to use the determined number of spatial streams. For example, the correlation-based rate adaptation module 302 (FIG. 3) may configure the wireless network interface hardware 204 (FIG. 2) with the parameter vector determined at step 1012. The procedure may then return to the beginning of the select and adjust loop (i.e., step 502 of FIG. 5).

Figure 11:
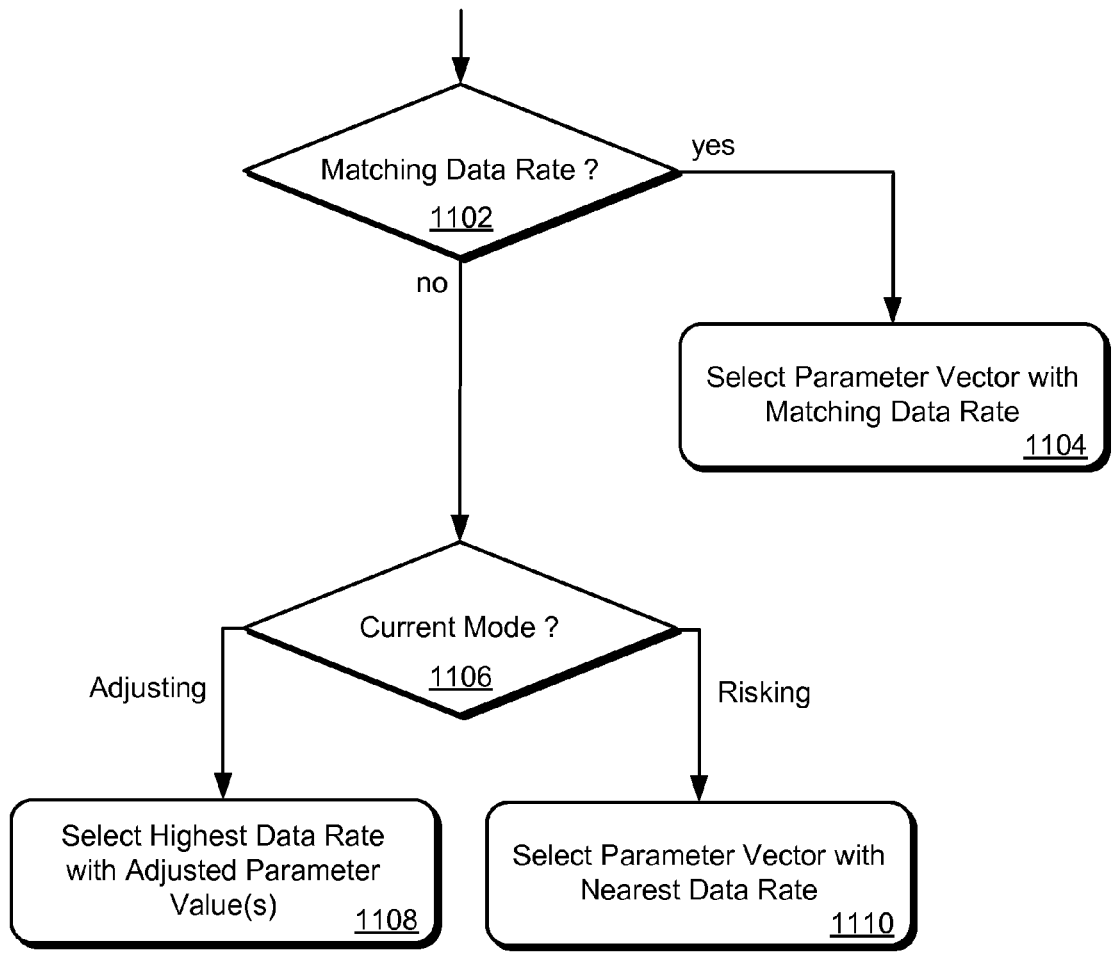
FIG. 11 is a flowchart depicting example steps for mapping a desired parameter vector to an available parameter vector in accordance with an embodiment of the invention.

As described above with reference to step 1012, it may be that a desired parameter vector is not available in a particular communication scheme, so that mapping to a suitable parameter vector is required. FIG. 11 depicts example steps for mapping a desired parameter vector to an available parameter vector in accordance with an embodiment of the invention.

At step 1102, it may be determined if there is an available parameter vector with an associated data rate that matches the data rate associated with the desired parameter vector. If there is such a parameter vector available in the communication scheme, a procedure incorporating steps depicted by FIG. 11 may progress to step 1104. Otherwise, the procedure may progress to step 1106. At step 1104, an available parameter vector with the matching data rate may be selected, and the procedure may progress, for example, to configuring network interface hardware with the selected parameter vector at step 1014 (FIG. 10).

At step 1106, the current mode of operation may be determined. For example, the mode module 312 (FIG. 3) may determine and/or provide the current mode of operation of the correlation-based rate adaptation module 302. If it is determined that the current mode of operation is the adjusting mode 404 (FIG. 4), the procedure may progress to step 1108. If it is determined that the current mode of operation is the risking mode 406, the procedure may progress to step 1110.

At step 1108, the set of available parameter vectors may be searched for an available parameter vector having parameter values matching adjusted values of the selected parameter(s) 310 (FIG. 3), and, if more than one such is found, further having a highest associated data rate. In contrast, at step 1110, the set of available parameter vectors may be searched for an available parameter vector having an associated data rate nearest the data rate associated with the desired parameter vector. In this example, the adjusting mode 404 (FIG. 4) selection strategy (i.e., step 1108) attempts to maintain the adjusted parameter value (e.g., resulting from step 1008 or step 1010 of FIG. 10), while the risking mode 406 selection strategy (i.e., step 1110) attempts to maintain the data rate associated with the adjusted parameter vector as a whole. Having selected a suitable parameter vector, the procedure may progress, for example, to configuring network interface hardware with the selected parameter vector at step 1014.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to an embodiment of the invention.

Preferred embodiments of the invention are described herein, including the best mode known to the inventors for carrying out the invention. Variations of those preferred embodiments may become apparent to those of ordinary skill in the art upon reading the specification. The inventors expect skilled artisans to employ such variations as appropriate, and the inventors intend for the invention to be practiced otherwise than as explicitly described herein. Accordingly, embodiments of the invention include all modifications and equivalents of the subject matter recited in the following claims as permitted by applicable law.

The invention claimed is:

1. At least one memory having thereon computer-executable instructions that, when executed by one or more processing units, cause the one or more processing units to perform communication data rate adaptation via operations comprising:
   determining a current mode of operation of a communication participant;
   determining a correlation map for a parameter space defined by a set of parameters based on, at least, a metric, the metric being based on, at least, the current mode of operation of the communication participant, the correlation map corresponding to one or more correlations between the set of parameters and the metric;
   determining whether there is a parameter-level correlation strategy applicable to a parameter from the set of parameters based on, at least, the correlation map; and
   adjusting the parameter to enhance communication performance in response to determining that there is the parameter-level correlation strategy applicable to the parameter, the enhancing including optimizing the parameter.

2. Said at least one memory of claim 1, wherein the set of parameters comprises parameters of a communication scheme.

3. Said at least one memory of claim 2, wherein the communication scheme comprises a wireless communication scheme.

4. Said at least one memory of claim 3, wherein the wireless communication scheme comprises a wireless local area network communication scheme.

5. Said at least one memory of claim 3, wherein the wireless communication scheme comprises a wireless communication scheme in accordance with an IEEE® 802.11n standard.

6. Said at least one memory of claim 1, wherein the set of parameters comprises a parameter corresponding to a number of spatial streams.

7. Said at least one memory of claim 1, wherein the set of parameters comprises a parameter corresponding to a space-time block coding.

8. Said at least one memory of claim 1, wherein the metric is further based on, at least, communication transmission data packet length.

9. Said at least one memory of claim 1, wherein the mode of operation includes:
   an adjusting mode that corresponds to a mode of operating in which the data rate adaption module adjusts a selected parameter to reduce a frequency of transmission failure events; or
   a risking mode that corresponds to a mode of operation in which the data rate adaption module adjusts a selected parameter to increase throughput.

10. Said at least one memory of claim 1, wherein the correlation map comprises a set of thresholds.

11. Said at least one memory of claim 10, wherein thresholds of the set of thresholds correspond to parameters of the set of parameters.

12. Said at least one memory of claim 1, wherein:
   the determining, selecting and adjusting steps are performed repeatedly; and determining the correlation map comprises updating the correlation map based on, at least:
the metric; and
a previously selected parameter.

13. Said at least one memory of claim 1, wherein selecting the parameter comprises selecting a most correlative parameter.

14. Said at least one memory of claim 1, wherein:
the correlation map comprises a set of thresholds; and
selecting the parameter comprises selecting a parameter corresponding to a threshold in the set of thresholds with a lowest value.

15. A method performed by one or more processing units configured with computer-executable instructions, the method comprising:
determining a transition of a communication participant from one mode of operation to another mode of operation in a plurality of modes of operation, the plurality of modes of operations including:
an initial mode;
an adjusting mode that corresponds to a mode of operation in which a selected parameter is adjusted to reduce a frequency of transmission failure events; and
a risking mode that corresponds to a mode of operation in which a selected parameter is adjusted to increase throughput;
determining a correlation map between a metric and at least one of a set of parameters, the metric being based on, at least, the another mode of operation of the communication participant;
applying a mode-level correlation strategy to adjust the correlation map based on the another mode of operation;
determining whether there is a parameter-level correlation strategy applicable to a parameter from the set of parameters based on, at least, the correlation map; and
adjusting the parameter to enhance communication performance in response to determining that there is the parameter-level correlation strategy applicable to the parameter, the enhancing communication performance including optimizing the parameter.

16. The method of claim 15, wherein the set of parameters comprises parameters of a wireless communication scheme.

17. The method of claim 15, wherein the determining the transition of the communication participant from one mode of operation to another mode of operation comprises determining the transition of the communication participant from the initial mode to the adjusting mode in response to detecting a transmission failure event.

18. The method of claim 15, wherein the determining the transition of the communication participant from one mode of operation to another mode of operation comprises determining the transition of the communication participant from the initial mode to the risking mode in response to detecting a transmission success event.

19. At least one memory having thereon computer-executable instructions that, when executed by one or more processing units, cause the one or more processing units to perform communication data rate adaptation via operations comprising:
determining a correlation map between a parameter space defined by a set of parameters and a metric structured to, at least, facilitate selection of a parameter from the set of parameters capable of being adjusted, the metric being based in part on at least a current mode of operation of a communication participant;
determining whether there is a parameter-level correlation strategy applicable to a parameter from the set of parameters based on, at least, the correlation map; and
adjusting the parameter to enhance communication performance in response to determining that there is the parameter-level correlation strategy applicable to the parameter, the enhancing including optimizing the parameter.

20. Said at least one memory of claim 19, wherein the set of parameters comprises:
a number of spatial streams;
a signal modulation scheme; and
a convolution coding rate.

* * * * *